(12) United States Patent
Thomas et al.

(10) Patent No.: US 8,051,176 B2
(45) Date of Patent: Nov. 1, 2011

(54) METHOD AND SYSTEM FOR PREDICTING CONNECTIONS IN A COMPUTER NETWORK

(75) Inventors: David Andrew Thomas, Atherton, CA (US); Brian K. Lynn, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2105 days.

(21) Appl. No.: 10/289,259

(22) Filed: Nov. 7, 2002

(65) Prior Publication Data

US 2004/0093406 A1    May 13, 2004

(51) Int. Cl.
    *G06F 15/16* (2006.01)
(52) U.S. Cl. .................. 709/227; 709/224; 709/225
(58) Field of Classification Search .................. 709/203, 709/238, 224–229
    See application file for complete search history.

(56) References Cited

U.S. PATENT DOCUMENTS

| 5,787,249 A | 7/1998 | Badovinatz et al. |
| 5,793,763 A | 8/1998 | Mayes et al. |
| 5,964,857 A | 10/1999 | Srinivasan et al. |
| 5,999,929 A * | 12/1999 | Goodman .................... 707/7 |
| 6,006,264 A | 12/1999 | Colby et al. |
| 6,006,272 A | 12/1999 | Aravamudan et al. |
| 6,067,565 A * | 5/2000 | Horvitz .................... 709/218 |
| 6,167,025 A | 12/2000 | Hsing et al. |
| 6,396,833 B1 | 5/2002 | Zhang et al. |
| 6,449,647 B1 | 9/2002 | Colby et al. |
| 6,470,389 B1 | 10/2002 | Chung et al. |
| 6,490,693 B1 | 12/2002 | Briskey et al. |
| 6,493,347 B2 | 12/2002 | Sindhu et al. |
| 6,496,866 B2 | 12/2002 | Attanasio et al. |
| 6,516,350 B1 * | 2/2003 | Lumelsky et al. ............ 709/226 |
| 6,560,630 B1 | 5/2003 | Vepa et al. |
| 6,601,101 B1 * | 7/2003 | Lee et al. .................... 709/227 |
| 6,606,645 B1 * | 8/2003 | Cohen et al. ................ 709/203 |
| 6,625,659 B1 | 9/2003 | Aramizu et al. |
| 6,643,693 B1 | 11/2003 | Reynolds et al. |
| 6,654,786 B1 | 11/2003 | Fox et al. |
| 6,718,330 B1 * | 4/2004 | Zenner ....................... 707/10 |
| 6,731,598 B1 | 5/2004 | Beliveau et al. |
| 6,742,045 B1 | 5/2004 | Jordan et al. |

(Continued)

FOREIGN PATENT DOCUMENTS

EP    1128613 A2    1/2001

OTHER PUBLICATIONS

"Locality-Aware Request Distribution in Cluster-Based Network Servers," by Vivek S. Pai, et al. (Proceedings of the ACM Eighth International Conference on Architectural Support for Programming Languages and Operating Systems (ASPLOS-VIII), Oct. 1998).

(Continued)

*Primary Examiner* — Faruk Hamza

(57) ABSTRACT

A method and system are disclosed for predicting connections in a computer network. In accordance with exemplary embodiments of the present invention, predictive connection information is determined for a second connection through a switch between a client and a plurality of servers. A first server of the plurality of servers determines the predictive connection information using at least connection information associated with a first connection through the switch between the client and the first server. The first connection is associated with the second connection. The predictive connection information is communicated from the first server to the switch.

16 Claims, 2 Drawing Sheets

U.S. PATENT DOCUMENTS

| | | | |
|---|---|---|---|
| 6,772,211 | B2 | 8/2004 | Lu et al. |
| 6,778,495 | B1 | 8/2004 | Blair |
| 6,795,866 | B1 | 9/2004 | Mankude et al. |
| 6,807,572 | B1 * | 10/2004 | Yu .................. 709/219 |
| 6,826,613 | B1 * | 11/2004 | Wang et al. .................. 709/227 |
| 6,850,982 | B1 | 2/2005 | Siegel |
| 6,876,654 | B1 | 4/2005 | Hegde |
| 6,876,656 | B2 | 4/2005 | Brewer et al. |
| 6,944,678 | B2 | 9/2005 | Lu et al. |
| 6,950,877 | B2 | 9/2005 | Asano et al. |
| 6,963,931 | B2 | 11/2005 | Bunn et al. |
| 6,982,978 | B1 | 1/2006 | Zhang et al. |
| 6,996,615 | B1 * | 2/2006 | McGuire .................. 709/226 |
| 6,999,459 | B1 | 2/2006 | Callon et al. |
| 7,020,707 | B2 | 3/2006 | Sternagle |
| 7,092,399 | B1 | 8/2006 | Cheriton |
| 7,123,613 | B1 | 10/2006 | Chawla et al. |
| 7,130,314 | B2 | 10/2006 | Bunn et al. |
| 7,251,692 | B1 | 7/2007 | Raz |
| 7,254,626 | B1 | 8/2007 | Kommula et al. |
| 2002/0026531 | A1 | 2/2002 | Keane et al. |
| 2002/0073232 | A1 * | 6/2002 | Hong et al. .................. 709/238 |
| 2002/0083193 | A1 * | 6/2002 | Terefenko .................. 709/238 |
| 2002/0095512 | A1 | 7/2002 | Rana et al. |
| 2002/0095528 | A1 | 7/2002 | Harper et al. |
| 2002/0120763 | A1 | 8/2002 | Miloushev et al. |
| 2002/0156612 | A1 | 10/2002 | Schulter et al. |
| 2002/0166080 | A1 | 11/2002 | Attanasio et al. |
| 2002/0172163 | A1 * | 11/2002 | Chen et al. .................. 370/281 |
| 2003/0043815 | A1 * | 3/2003 | Tinsley et al. ........... 370/395.21 |
| 2003/0084140 | A1 * | 5/2003 | Takeuchi et al. .............. 709/223 |
| 2003/0097454 | A1 | 5/2003 | Yamakawa et al. |
| 2003/0097481 | A1 | 5/2003 | Richter |
| 2003/0154236 | A1 | 8/2003 | Dar et al. |
| 2003/0236882 | A1 * | 12/2003 | Yan et al. .................. 709/225 |
| 2004/0039820 | A1 | 2/2004 | Colby et al. |
| 2004/0068681 | A1 | 4/2004 | Smith |
| 2004/0133691 | A1 * | 7/2004 | Shimada .................. 709/229 |
| 2004/0162901 | A1 * | 8/2004 | Mangipudi et al. ........... 709/225 |

OTHER PUBLICATIONS

"Interconnections, Second Edition,", Table of Contents and Preface, by Radia Perlman (Addison-Wesley, 2000).

Oliver Spatscheck, et al., "Optimizing TCP forwarder performance," IEEE/ACM Transactions on Networking, vol. 8, No. 2, pp. 146-157, Apr. 2000.

Scalable Content-aware Request Distribution in Cluster-based Network Servers, by Mohit Aron et al., Department of Computer Science, Rice University, Houston, Texas 77005, 15 pgs., 2000.

Bestavros et al~"TCP Boston: A Fragmentation-tolerant TCP Protocol for ATM Networks"~Proc of Infocom '97: The IEEE Int'l Conf on Computer Communication~27 pgs~Apr. 1997.

Bestavros~An adaptive information dispersal algorithm for timecritical reliable communications~Network Management and Control vol. Il~pp. 423-438~1994.

Garay et al~"Secure Distributed Storage and Retrieval"~Proc of 11th Int'l Workshop on Distributed Algorithms~Lecture Notes in Computer Science 1320~pp. 275-289~1997.

Rabin~"Efficient dispersal of information for security, load balancing and fault tolerance"~Journal of the ACM 36(2)~pp. 335-348~Apr. 1989.

* cited by examiner

METHOD AND SYSTEM FOR PREDICTING CONNECTIONS IN A COMPUTER NETWORK

CROSS REFERENCE TO RELATED APPLICATIONS

This application is related to U.S. Patent Application entitled "Method and System for Managing Fragmented Information Packets in a Computer Network," Ser. No. 10/289,308, to U.S. patent application entitled "Method and System for Managing Connections in a Computer Network," Ser. No. 10/289,288, to U.S. patent application entitled "Method and System for Communication Information Between a Switch and a Plurality of Servers in a Computer Network," Ser. No. 10/289,282, to U.S. patent application entitled "Method and System for Reestablishing Connection Information on a Switch Connected to a Plurality of Servers in a Computer Network," Ser. No. 10/289,311, and to U.S. patent application entitled "Method and System for Managing Communication in a Computer Network Using Aliases of Computer Network Addresses," Ser. No. 10/289,379, each of which is filed even date herewith and each of which is hereby incorporated by reference in its entirety.

BACKGROUND

1. Field of the Invention

The present invention relates to computer networks. More particularly, the present invention relates to a method and system for predicting connections in a computer network.

2. Background Information

To access information on the Internet and, more particularly, the World Wide Web (WWW), users access websites that offer information and/or services. The information and/or services offered by a website are stored in and provided by computer network servers that are generally located remotely from the user. As the number of Internet users grow, computer network servers can experience an increase in the number of connections from clients to access the information and/or services available on these websites. To handle the increased connection load, the computer network servers can be scaled to meet the increased demand. For example, computer network servers can be replicated and the server replicas can be clustered to meet the increased demand. Thus, as the client connection load increases, more servers can be replicated and clustered. Because of their scalability and flexibility, computer network server clusters have become a popular method of meeting increasing communications traffic demands.

Computer network servers based on clusters of workstations or personal computers (PCs) generally include a specialized "front-end" device that is responsible for distributing incoming requests from clients to one of a number of "back-end" nodes, where the "back-end" nodes are responsible for processing the incoming requests from the clients. The front-end is responsible for handing off new connections and passing incoming data from the client to the back-end nodes. In cluster server architectures, the front-end can use weighted round-robin request distribution to direct incoming requests to the back-end nodes. With weighted round-robin distribution, incoming requests are distributed in round-robin fashion and are weighted by some measure of the load on the different back-ends.

To distribute the communications traffic among the back-end nodes, the front-end acts as a load balancer that attempts to evenly distribute the communications traffic load from the clients among the available back-end nodes. A load balancer can be, for example, a switch that connects the servers to the clients for whom the information and/or services are to be provided. To meet increasing connection loads, the load balancers can be upgraded with faster computer processors and more internal computer memory. To further increase performance and improve connection distribution among the back-end nodes, the front-end can use, for example, the content requested, in addition to information about the load on the back-end nodes, to choose which back-end server will handle a particular request.

Content-based request distribution is discussed in, for example, "Locality-Aware Request Distribution in Cluster-Based Network Servers," by Vivek S. Pai, et al. (Proceedings of the ACM Eighth International Conference on Architectural Support for Programming Languages and Operating Systems (ASPLOS-VIII), October 1998), the disclosure of which is incorporated herein by reference in its entirety. However, current load balancers (e.g., front-end switches) do not use the resources offered by the back-end server nodes, which are typically faster and more powerful than the load balancers, to assist the load balancer in determining the distribution of the connections among the back-end nodes. Rather, current load balancers determine request distribution autonomously from the back-end nodes.

One example of a conventional load balancer that can act as a front-end for a computer network cluster is a Layer Four (L4) switch. A L4 switch takes into account Transport Layer information (i.e., Layer Four of the International Organization for Standardization (ISO) Networking model, or ISO model). A discussion of computer network protocols and layers of the ISO model is discussed, for example, in "Interconnections, Second Edition," by Radia Perlman (Addison-Wesley, 2000), the disclosure of which is incorporated herein by reference in its entirety. L4 switches manipulate both the network and transport protocol headers of the communications traffic passing through them to forward the communications traffic to the back-end nodes. A L4 switch can operate with, for example, the Internet Protocol (IP) for the network layer and the Transport Control Protocol (TCP) for the transport layer.

Load balancers also handle connections associated with embedded links of a website. That is, a website can have embedded links to other websites or to information of possible interest to the user. When a user accesses these embedded links, a new connection is established which the switch allocates to one of the back-end servers. The back-end servers can keep detailed logs and other information on user activity and the links that users have traversed. Thus, the back-end servers can keep a log or trace of access patterns of users. However, neither the switch nor the back-end servers use activity logs and access patterns to dynamically manage connections.

SUMMARY OF THE INVENTION

A method and system are disclosed for predicting connections in a computer network. In accordance with exemplary embodiments of the present invention, predictive connection information is determined for a second connection through a switch between a client and a plurality of servers. A first server of the plurality of servers determines the predictive connection information using at least connection information associated with a first connection through the switch between the client and the first server. The first connection is associated with the second connection. The predictive connection information is communicated from the first server to the switch.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
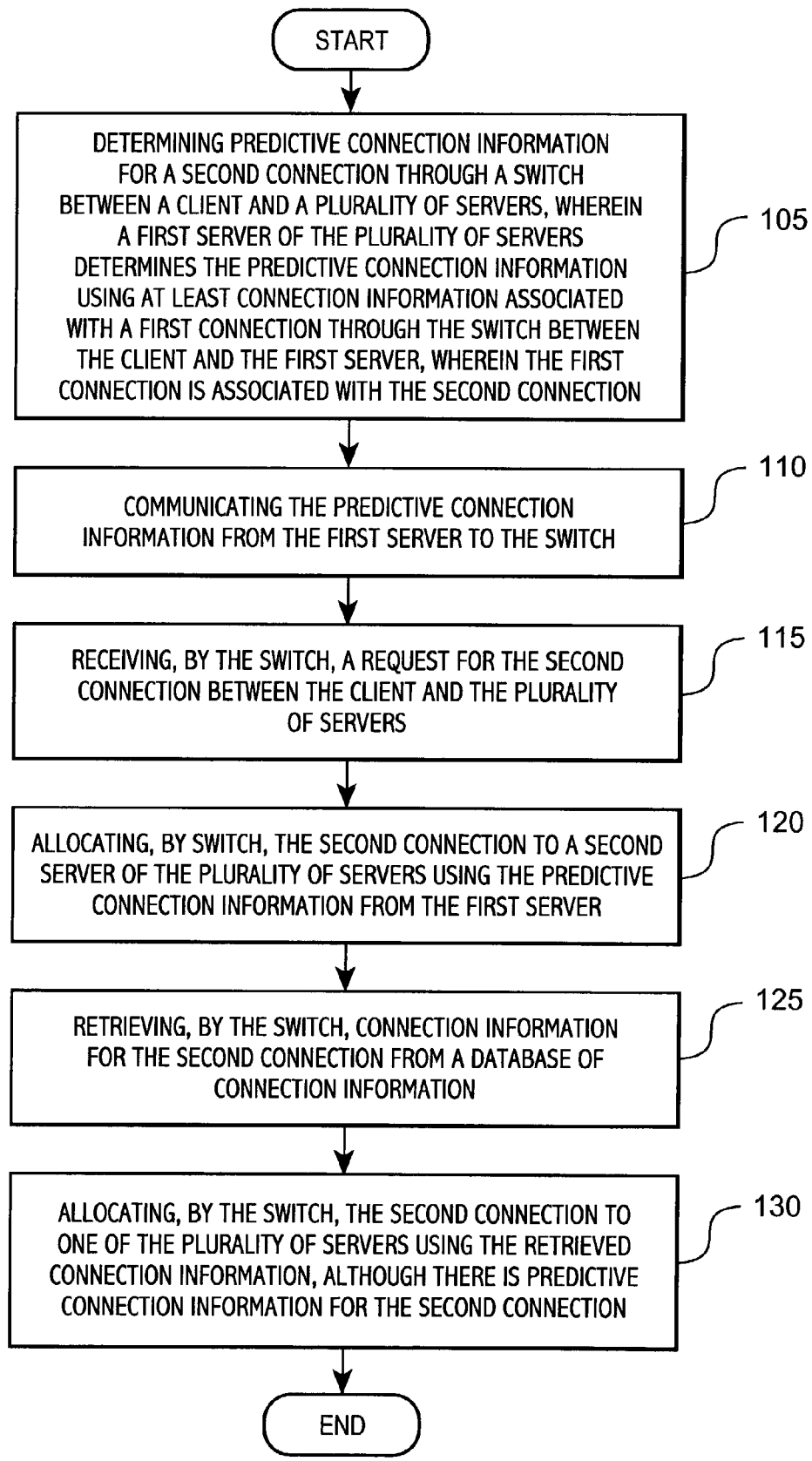
FIG. 1 is a flowchart illustrating a method for predicting connections in a computer network in accordance with an exemplary embodiment of the present invention.

FIG. 1 is a flowchart illustrating a method for predicting connections in a computer network in accordance with an exemplary embodiment of the present invention. By monitoring selected activity over the network (e.g., as recorded in activity logs and access patterns), exemplary embodiments can dynamically manage connections. Anticipated connections a particular client is likely to use can be predicated as a function of historical client/server connections. For example, where a client user has a history of activating the same embedded link each time a particular web page is accessed, this information can be used to predict connections through the switch and manage load among the back-end servers accordingly.

Referring to step 105 of FIG. 1, predictive connection information is determined for a second connection through a switch between a client and a plurality of servers. A first server of the plurality of servers determines the predictive connection information using at least connection information associated with a first connection through the switch between the client and the first server, where the first connection is associated with the second connection.

According to exemplary embodiments, the computer network can be any type of computer network in which information in the form of packets can be transmitted, received, otherwise communicated within and throughout the computer network. For example, the computer network can be a local area network (LAN), wide area network (WAN), any type of intranet or internet, or any other type of computer network or computer system capable of transporting packets of information.

As used herein, an "information packet" can be any format of aggregated bits that forms a protocol data unit (PDU) that is capable of carrying any type of information over a packet-switching network. The information packet can carry, for example, data, commands, or any other type of information. According to exemplary embodiments, an information packet can be a transmission control protocol (TCP) PDU, a user datagram protocol (UDP) PDU, or any other form of packet that is capable of carrying any type of information over a packet-switching network.

The switch can receive an information packet through the computer network from any number of clients. As used herein, a "client" can be any type of computer system, such as, for example, a personal computer (PC), a workstation, a minicomputer, a supercomputer, or any other form of computer system capable of transmitting and receiving information packets over a computer network.

According to exemplary embodiments, the client can request, for example, information or services from one or more of the plurality of servers over the computer network. The switch can be connected to the clients remotely. If connected remotely, the computer network can be any form of WAN or for example, the Internet. However, the switch can be connected to the clients locally using, for example, a LAN or a direct connection to the switch.

Each of the plurality of servers can also be any type of computer system, such as, for example, a personal computer (PC), a workstation, a minicomputer, a supercomputer, or any other form of computer system capable of transmitting and receiving information packets over a computer network. Each server of the plurality of servers can provide, for example, information or services to one or more clients over a computer network in response to requests from the one or more clients for such information or services. Exemplary embodiments of the present invention can include any number of servers.

The plurality of servers can also be connected to the switch through a network. The network can be any type of computer network where the layer 2 header is preserved (such as, for example, a LAN, WAN, or any form of intranet where the layer 2 header is preserved). The plurality of servers can be connected to the switch through the network using any form of computer network connection, such as, for example, an Ethernet connection. According to an alternate embodiment, the plurality of servers can be connected directly to the switch using any form of connection (e.g., electrical, optical, wired, wireless, and so forth) capable of transmitting and receiving information between the plurality of servers and the switch. In such an alternate embodiment, the network connection through the network is a direct connection. According to exemplary embodiments, although the plurality of servers can communicate with the clients through the switch, the plurality of servers can send additional information packets to clients through the computer network using alternate mechanisms. For example, the plurality of servers can also include additional network interfaces that connect each of the servers to the computer network so that computer network communication can take place without the use of the switch.

According to exemplary embodiments, the switch can be a Layer 4 (L4) switch. A L4 switch takes into account Transport Layer Information (i.e., Layer 4 of the ISO model). For example, the L4 switch can examine port numbers of the TCP protocol, although the switch can use other transport and network protocols, such as, for example, UDP. A switch can operate at the Data Link Layer (i.e., Layer 2 of the ISO model). An exemplary Data Link Layer is Ethernet. An Ethernet switch can forward packets without modification.

In contrast to a switch, a router can operate at the Network Link Layer (i.e., Layer 3 of the ISO model). An example of a Network Link Protocol is the Internet Protocol (IP). A network router can interconnect different link layers and generate a new link layer header for each packet passing through the network router. A network router can also manipulate the IP header of packets passing through the network router.

The switch can be a hybrid of the Ethernet switch and the network router. For example, the switch can rewrite or otherwise manipulate the link layer header of information packets, but does not modify information packets in the manner performed by routers. According to exemplary embodiments, the switch can use the IP protocol for the network layer and the TCP protocol for the transport layer, although different protocols can be used for the various layers.

The switch can store, maintain, and manage several tables that can be used to forward information packets between the clients and the plurality of servers. Each table is a collection of information that can be stored in any type of computer memory in the switch, such as, for example, Random Access Memory (RAM), a hard disk, or any other type of electronic storage medium. For each table, a key/value pair can be used to access information—the key is used to index and locate information in the table and the value is associated with the key.

A table that can be maintained by the switch is a connection table. The connection table maps connections that the switch has been informed about to the server that is handling the connection, wherein information packets are communicated between a client and a server of the plurality of servers over the connection. A value field of the connection table can hold, for example, the name, address or any other designation of a server. A key field can be used to index or otherwise locate the value in a value field that corresponds to the particular key field. According to an exemplary embodiment, the connection table can be a hash table maintained in RAM of the switch.

According to exemplary embodiments, another table that can be maintained by the switch is a default content addressable memory (CAM). The default CAM can provide, for example, an initial assignment of connections to servers. According to exemplary embodiments, the default CAM can be a ternary CAM.

A role of the default CAM, according to exemplary embodiments of the present invention, is to implement a dispersal algorithm for handling the absence of connection information in the connection table. The default CAM can be accessed during an initial assignment of connections as mentioned, but can also be accessed when connection information has been lost, deleted, or rendered inaccessible from the connection table for any reason. The dispersal algorithm can be established at the switch by the system in advance, or can be established at the switch by having at least one of the plural servers notify the switch of the dispersal algorithm to be used for allocating computer network address space of the plural servers. In this latter case, a first server can run the dispersal algorithm on all of its connections, and inform all of its potential victim servers of the connections each such victim server will be handling for the first server. Each of the remaining servers can do the same.

An exemplary dispersal algorithm can be a predetermined pattern matching algorithm implemented using a ternary CAM (or other desired mechanism). In a scenario where information (e.g., first information) is directed to the switch from a client, but there is no connection information in the connection table of the switch, the default CAM can be accessed to identify an appropriate so-called victim server to which the first information packet should be forwarded. The servers handle the forwarding of the first information packet from the victim server to the appropriate destination server. A ternary CAM is suitable for use as the default CAM because it is a content addressable memory with "don't care" matching to provide wildcards on various fields of value field as accessed by key field. Thus, the ternary CAM can provide pattern matching. If a value matches several patterns in default CAM, a priority encoder can be used to determine the result. Priority encoders are described, for example, in U.S. Pat. No. 5,964,857, the entire disclosure of which is hereby incorporated herein.

For example, each information packet can include a connection tuple having a designated number of bits used to represent at least five fields for specifying a source Internet Protocol (IP) address, a destination IP address, a source port, a destination port and a protocol. These bits can be considered to designate an address space that can be allocated among the plural servers. In the absence of connection information in the connection table, the default CAM can be accessed to determine a match on a selected number of these bits (e.g., a match on the four least significant bits of the source IP address whereby a first portion of the address space from "0000" to "0011" can be allocated to a first of four servers). The information packet is thus forwarded to the server preassigned to handle any information packets within the first portion of the address space. The servers can have a preestablished mechanism (e.g., victim tables) for forwarding information packets from a particular victim server to an appropriate destination server.

As an alternate to using predetermined pattern matching, the dispersal algorithm can, for example, be a hash function. That is, any or all of the bits received in an information packet can be used to calculate an entry to a hash table, which in turn, designates an appropriate victim server.

In addition to the connection table and the default CAM, another table that can be maintained by the switch is a server-alias table. According to exemplary embodiments, the server-alias table can perform several functions. For example, server-alias table can contain a list of the plurality of servers. The name, address or other designation of each of the servers can be the value accessed by a key to index or otherwise locate information in the server-alias table (e.g., the Ethernet address corresponding to the IP address of a server). The server-alias table can also contain a list of alias addresses for servers that are used by the switch.

According to exemplary embodiments, each of the plurality of servers can also store, maintain, and manage several tables for connection management. Each table is a collection of information that can be stored in any type of computer memory in each of the plurality of servers, such as, for example, Random Access Memory (RAM), a hard disk, or any other type of electronic storage medium. For each table, a key/value pair can be used to access information—the key is used to index and locate information in the table and the value is associated with the key.

Each of the plurality of servers can have a connection table. The server connection table can contain a list of the connections for which the server is the terminating server. In other words, the server connection table lists those connections that the server is handling. Each of the plurality of servers also includes a victim table. The victim table can contain the connection information that the server handles on behalf of another server. In other words, the victim table lists the non-terminating connections on which the server receives packets (e.g., fragmented packets). For each of the packets received on the non-terminating connection, the victim table lists the terminating server to which the non-terminating server can relay the packets. As already mentioned, the victim tables can be populated as a function of the selected dispersal algorithm.

For purposes of illustration, IP addresses are denoted by uppercase letters (e.g., C1, C2, S, T, U). Ethernet addresses (i.e., Medium Access Control (MAC) addresses) are denoted by lowercase letters (e.g., c1, c2, s, t, u).

According to exemplary embodiments, the switch can connect a plurality of servers to clients over the computer network. Thus, the switch can act as a "front-end" to the plurality of servers, while the plurality of servers can act as the "back-end." According to exemplary embodiments, IP aliasing can be used when communicating information packets between the plurality of servers and the clients through the switch. With IP aliasing, the switch and the plurality of servers can be addressed to clients using a single, collective IP address (e.g., an address "V"). In other words, the switch and the plurality of servers appear as a single computer system with a single IP address (e.g., address "V"), such that "knowledge" of the separate components is hidden from the clients.

Thus, when a client addresses the switch and plurality of servers, the client simply sends an information packet to a single IP address (e.g., address "V"). The switch can then direct the packet to the server handling the connection to the client. When sending information packets to clients using IP aliasing, each of the plurality of servers can write the IP source address as the single, collective IP address (e.g., address "V"), and not the server's unique IP address. However, according to exemplary embodiments, at the Ethernet layer, each of the plurality of servers can use their individual Ethernet addresses (i.e., MAC address) as their source Ethernet address.

According to exemplary embodiments, amongst the Layer 2 (L2) (i.e., Ethernet) packet layer, Layer 3 (L3) (i.e., IP) packet layer, and the L4 (e.g., TCP) packet layer, there are six fields which can used to represent packets: an Ethernet destination address (from the L2 packet layer); an Ethernet source address (from the L2 packet layer); a source IP address (from the L3 packet layer); a destination IP address (from the L3 packet layer); a source port (from the L4 packet layer); and a destination port (from the L4 packet layer). Those skilled in the art will appreciate that an additional protocol field can be included (e.g., to identify TCP), and need not be discussed further, For purposes of illustration and not limitation, a packet from a first client (e.g., "C1") to the switch and plurality of servers (i.e., "V") can have the following fields, where "s" represents the Ethernet address of a first server, "x" represents the Ethernet address of the switch, and "PA" and "PB" are the source and destination TCP ports, respectively: [x, c1, C1, V, PA, PB]. For example, if the first server is handling the connection, the switch can rewrite the packet as: [s, x, C1, V, PA, PB]. When the server sends a reply, the server uses the IP alias "V" instead of its own IP address. Consequently, the reply packet is: [x, s, V, C1, PB, PA].

As noted, the reply packet swaps the source and destination IP addresses. From this swapping, a canonical addressing format can be used to represent packets as follows: <client IP address, server IP address, client port, server port>. In accordance with exemplary embodiments of the present invention, the canonical addressing format can be used to represent packets and connections. According to exemplary embodiments, if the packet came from a client, then the fields are in canonical form. If the packet came from a server, then the fields can be swapped to generate the canonical form. The switch can use its server-alias table to determine if the packet was sent by a server, and, therefore, the fields should be rearranged. Alternatively, if "V" is the source IP address, then the fields should be swapped. By using a canonical form in accordance with exemplary embodiments, the switch's connection table can use a single entry to track a connection for each packet direction. Alternatively, two indices can be used—one for each packet direction.

Step 105 of FIG. 1 involves predicting a sequence of connections (e.g., use prediction to create speculative entries in the switch to more appropriately steer future predicted connections). For the example of servicing a web request, pages are returned from the web server which contain URL links. By monitoring previous dynamic behavior of the system (e.g., by monitoring those links selected by the user when viewing a web page at a client), information about links most likely to be chosen upon a subsequent connection to the website can be used to bias traffic associated with servicing a particular web request to a particular server. By anticipating the link which a user may select at the client, system performance can be enhanced. Such features will be described with respect to the system of FIG. 2.

Figure 2:
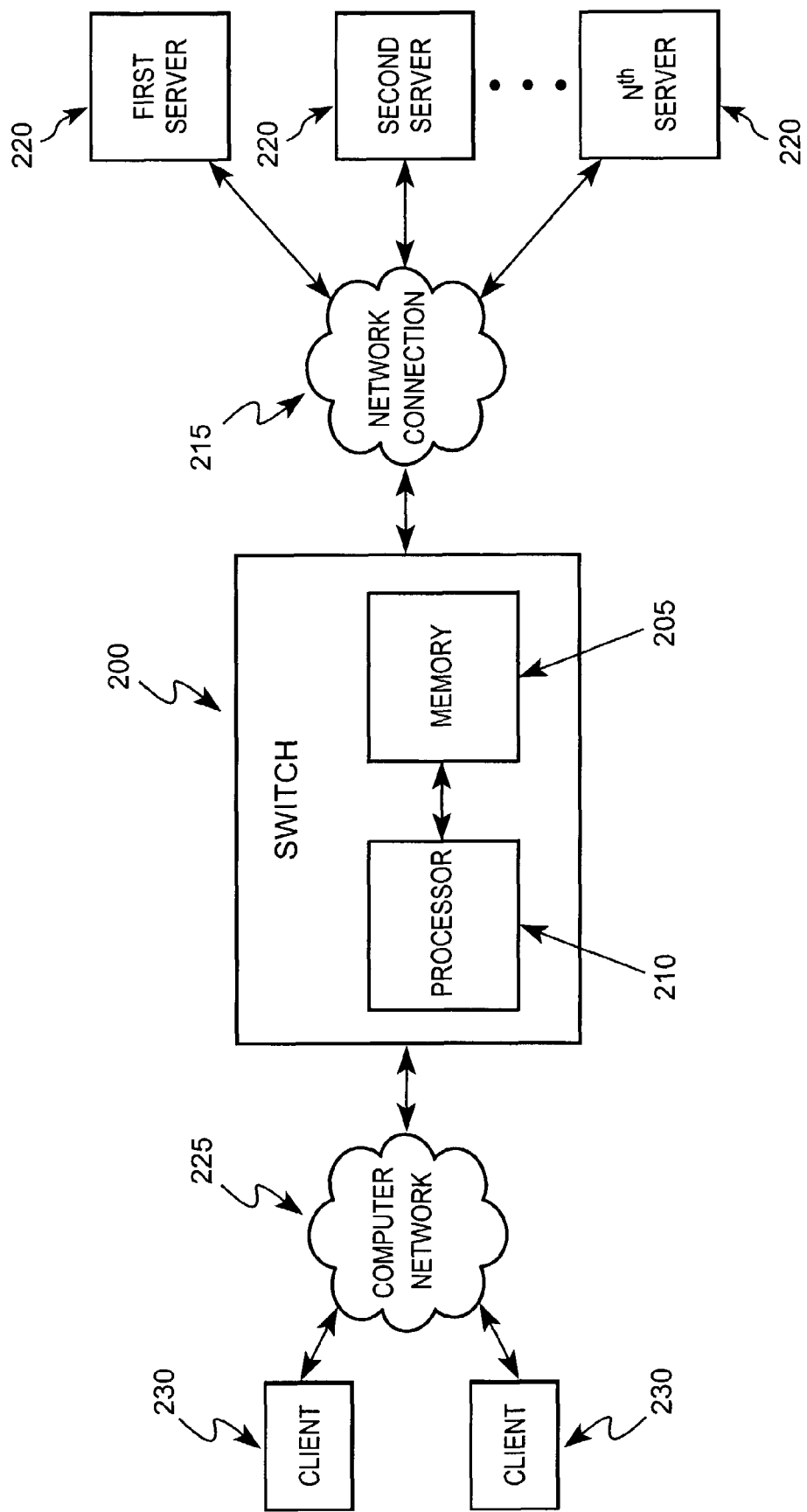
FIG. 2 is a block diagram illustrating a switch for predicting connections in a computer network in accordance with an exemplary embodiment of the present invention.

FIG. 2 is a block diagram illustrating a switch 200 for predicting connections in a computer network in accordance with an exemplary embodiment of the present invention. Switch 200 can include a memory device 205 for storing predictive connection information for a second connection through the switch 200 between a client 230 and a plurality of servers 220. Memory device 205 can be any computer memory or any other type of electronic storage medium that is located either internally or externally to switch 200. In an exemplary embodiment, the default CAM can be used because it handles connections for which no entry exists in the switch's connection table.

According to exemplary embodiments, the predictive connection information can be determined by a first of the plural servers using connection information associated with a first connection through the switch between the client and the first server. The first connection is associated with the second connection (e.g., possess characteristics common to the second connection, such as a common URL).

Switch 200 can communicate information packets with one or more clients 230 through computer network 225. Switch 200 can be connected to clients 230 remotely (e.g., any form of WAN, or the Internet). Alternately, or in addition, switch 200 can be connected to clients 230 locally (e.g., a LAN, or a direct connection to switch 200). Exemplary embodiments of the present invention can include any number of servers 220.

Servers 220 can be connected to switch 200 through a network 215 (e.g., a LAN, WAN, or any form of intranet where the L2 header is preserved) using any form of computer network connection (e.g., an Ethernet connection). Alternately, or in addition, the servers 220 can be connected directly to the switch 200 using any form of connection capable of transmitting and receiving information between the plurality of servers 220 and the switch 200. According to exemplary embodiments, memory device 205 of switch 200 can store at least a connection table, a default CAM, and a server-alias table.

Each of the plurality of servers 220 can also store, maintain, and manage several tables for connection management. For example, each of the plurality of servers 220 can have a connection table, and a victim table.

In accordance with exemplary embodiments, the switch will look to the connection table for identifying a server to handle a connection. However, in the absence of a connection table entry, the default CAM is consulted.

The default CAM, according to an exemplary embodiment, provides these general functions: (1) an initial assignment of full connections (e.g., connections for which the switch receives a full connection tuple); (2) mapping of non-first fragments (i.e., information packet fragments which do not include the connection information); and (3) connection speculation. Where separate memories are associated with each of these, consultation with the ternary CAM may result in three different matches, or "hits". Accordingly, the hits received can be prioritized in any desired fashion.

In one embodiment, fragment mapping is afforded highest priority, followed by initial assignment of a connection, and then speculation. Within each of these functional areas of the default CAM, the closest match is accepted. Again, the prioritization among multiple hits can be resolved by a priority encoder at the switch.

In Step 110 of FIG. 1, predictive connection information is communicated from a first server, such as the first server in FIG. 2, to the switch (e.g., switch 200). For example, assume that a first client 230 has established a connection with the first server 220. During the servicing of this connection, first server 220 can provide some data to the first client 230, and then speculate that first client 230 will make another request for additional data. This additional request will result in the first client 230 opening a new connection to the first server 220.

Accordingly, when the first server 220 (S1) responds to the first connection, it can communicate to the switch 200 that future connections associated with a first client (C1), be directed to a particular (e.g., a different) server.

For example, the default CAM, which includes a table of one or more rules used to match an incoming information packet to a particular server, can be updated by the first server. The various rules can be hierarchically ordered. In an exemplary embodiment, a predetermined pattern matching dispersal algorithm, as previously discussed, can be afforded highest priority. Use of a wildcard "asterisk" for the source port can avoid any need to predict the port that the client will use for future connections. However, connections which are not wildcarded take priority over wildcard table entries. Alternately, or in addition, heuristics can be used to anticipate the port a client may use based on previous experience.

For example, upon the establishment of a first connection with the first client, the first server can use activity logs and/or access patterns stored in its memory to predict that the first client will open a second connection. The first server can inform the switch to watch for this requested connection, and instruct that the switch establish the connection with a second server (S2) using a message communicated from the first server 220 to the switch 200 of, for example, the following form:

<C,S,tcp,*,SP>⇒S2

In this message, "C" is the client (source address), "S" is the server (destination address), "tcp" is the protocol, and "SP" is the source port. The "*" represents a wild card for the client port. Using this message, the switch can determine that future connections matching a particular pattern should be directed to a second server designated "S2". This message can be added to a table of rules consulted by the switch 200 for packet forwarding. Other rules can include, for example, use of a hash table as previously discussed, to allocate information packets having particular bit configurations to particular servers.

Thus, when a subsequent connection is generated by the client 230, a speculation entry can be used to direct that connection to the second server S2. This is reflected in step 115 in FIG. 1, wherein upon receipt of a request for a second connection from the client 230, the connection is allocated by the switch to a second server (e.g., server S2) using the predictive connection information previously received from the first server as illustrated in step 120.

As illustrated in step 125, the switch can process the request for a second connection by retrieving connection information for the second connection from the database of connection information stored within of memory 205. In step 130, the switch can allocate the second connection to one of the plurality of servers (e.g., a second server S2) using the retrieved connection information.

The switch 200 can include a processor 210 for receiving predictive connection information from the first server and for controlling its storage at the switch 200. Although the database of connection information is illustrated as being stored at the switch, it can, of course, be stored at any desired location accessible by the switch (e.g., at a location external to the switch).

Predictive connection information can be determined by the first server based on a request received by that server from the client via the first connection and a recorded history of client activity associated with the first connection (e.g., previous connection pattern based on a historical sequence of operations performed). Those skilled in the art will appreciate that a connection can be triggered off of any desired event. For example, the first server can instruct the switch to open a connection with the second server upon receipt of a fifth message from the client C1, or upon the occurrence of any specific event. In accordance with exemplary embodiments, the determination of predictive connection information can include a step of analyzing, by the first server (e.g., the first server 220), connection usage patterns of the first connection. Alternately, or in addition, predictive connection information can be based on at least client information transmitted from the client.

The predictive connection information supplied from the first server (e.g., first server 220) to the switch can, for example, be generated by using the first server to analyze usage/traffic logs which it records over time. Alternately, or in addition, the predictive information can be based on client information, such as information generated by a web server and previously stored in the client (e.g., cookies). Cookies stored at a client can be transferred via the switch 200 to the first server 220 during the first connection, and retained by the first server for use in subsequent predictive connections.

The switch 200 can be optionally configured to discard predictive connection information before allocating the second connection to the second server (server S2). During ongoing operation, the system can be configured such that any of the plural of servers can also delete predictive connection information stored at the switch. The predictive connection information can be deleted in response to an asynchronous request, or can be deleted at periodic or a periodic intervals (e.g., can be deleted after a predetermined time interval). The predictive connection information can be deleted using any desired deletion selection function.

In exemplary embodiments, connection speculation can be limited to those instances where the packet received is an initiation packet of a connection (e.g., a SYN packet in TCP).

Where, for example, a first client C1 forwards an information packet to the switch, and there is no connection table entry for the connection, or match in the fragment mapping or speculation portions of the default CAM, the switch provides an initial assignment to a server, such as the first server (e.g., using the dispersal algorithm). When the server sends a sync acknowledgment (SYN-ACK), a connection table entry is created for routing future information packets on the same connection to the first server.

Where the first server speculates the first client C1 will send a new connection, the first server sends a speculation connection request with the anticipated properties to the switch for storage in the default CAM. When the first client sends an information packet to the switch with the new connection information, the switch determines that there is no match in the connection table, but that there is a match to the speculation entry. When the second server S2 receives the connection, it can then establish an entry in the connection table or instruct the switch to point to yet a third server. In an exemplary embodiment, speculation can be made using the L4 header, and the payload need not be used.

The steps of a computer program as illustrated in FIG. 1 for predicting connections in a computer network can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for predicting connections in a computer network having a switch between a client and a plurality of servers, said method comprising the steps of:
in a first server of the plurality of servers, determining predictive connection information for a second connection through the switch between the client and a second server of the plurality of servers using at least connection information associated with a first connection through the switch between the client and the first server, wherein the first connection is associated with the second connection, and wherein the predictive connection information is determined based on a previous connection pattern; and
communicating the predictive connection information for the second connection from the first server to the switch.

2. The method of claim 1, comprising the steps of:
receiving, by the switch, a request for the second connection between the client and the plurality of servers; and
allocating, by the switch, the second connection to the second server of the plurality of servers using the predictive connection information from the first server.

3. The method of claim 2, wherein the switch discards the predictive connection information before allocating the second connection to the second server.

4. The method of claim 1, wherein one of the plurality of servers deletes the predictive connection information on the switch.

5. The method of claim 1, wherein the predictive connection information is stored in a computer memory of the switch.

6. The method of claim 1, wherein the predictive connection information is deleted in the switch after a predetermined time interval.

7. The method of claim 1, wherein the predictive connection information is deleted in the switch using a deletion selection function.

8. A method for predicting connections in a computer network having a switch between a client and a plurality of servers, said method comprising the steps of:
in a first server of the plurality of servers, determining predictive connection information for a second connection through the switch between the client and a second server of the plurality of servers using at least connection information associated with a first connection through the switch between the client and the first server, wherein the first connection is associated with the second connection, wherein the step of determining the predictive connection information comprises analyzing, by the first server, connection usage patterns of the first connection; and
communicating the predictive connection information for the second connection from the first server to the switch.

9. A switch for managing communication in a computer network having a client and a plurality of servers, said system comprising:
a memory device for storing predictive connection information for a second connection through the switch between the client and a second server of the plurality of servers,
wherein the predictive connection information is determined by a first server of the plurality of servers using at least connection information associated with a first connection through the switch between the client and the first server, wherein the first connection is associated with the second connection; and
a processor for receiving the predictive connection information from the first server, wherein the processor analyzes connection usage patterns of the first connection to determine the predictive connection information.

10. The switch of claim 9, wherein the processor receives a request for a second connection through the switch between the client and the plurality of servers, and wherein the processor allocates the second connection to the second server of the plurality of servers using the predictive connection information from the first server that is stored in the memory device.

11. The switch of claim 10, wherein the switch discards the predictive connection information before allocating the second connection to the second server.

12. The switch of claim 9, wherein one of the plurality of servers deletes the predictive connection information stored in the memory device.

13. The switch of claim 9, wherein the predictive connection information is deleted in the memory device after a predetermined time interval.

14. The switch of claim 9, wherein the predictive connection information is deleted in the memory device using a predetermined deletion selection function.

15. A method for predicting connections in a computer network having a switch between a client and a plurality of servers, said method comprising the steps of:
in a first server of the plurality of servers, determining predictive connection information for a second connection through the switch between the client and a second server of the plurality of servers using at least connection information associated with a first connection through the switch between the client and the first server, wherein the first connection is associated with the second connection; and
communicating the predictive connection information for the second connection from the first server to the switch, wherein said first connection enables a first resource to be retrieved from the first server and said second connection enables a second resource to be retrieved from the second server of the plurality of servers, and wherein the first resource differs from the second resource.

16. A switch for managing communication in a computer network having a client and a plurality of servers, said system comprising:
  a memory device for storing predictive connection information for a second connection through the switch between the client and a second server of the plurality of servers,
  wherein the predictive connection information is determined by a first server of the plurality of servers using at least connection information associated with a first connection through the switch between the client and the first server, wherein the first connection is associated with the second connection; and
  a processor for receiving the predictive connection information from the first server, wherein said first connection enables the client to retrieve a first resource from the first server, and wherein said second connection enables the client to retrieve a second resource from the second server, said first resource differing from the second resource.

* * * * *